United States Patent Office 2,742,203
Patented Apr. 17, 1956

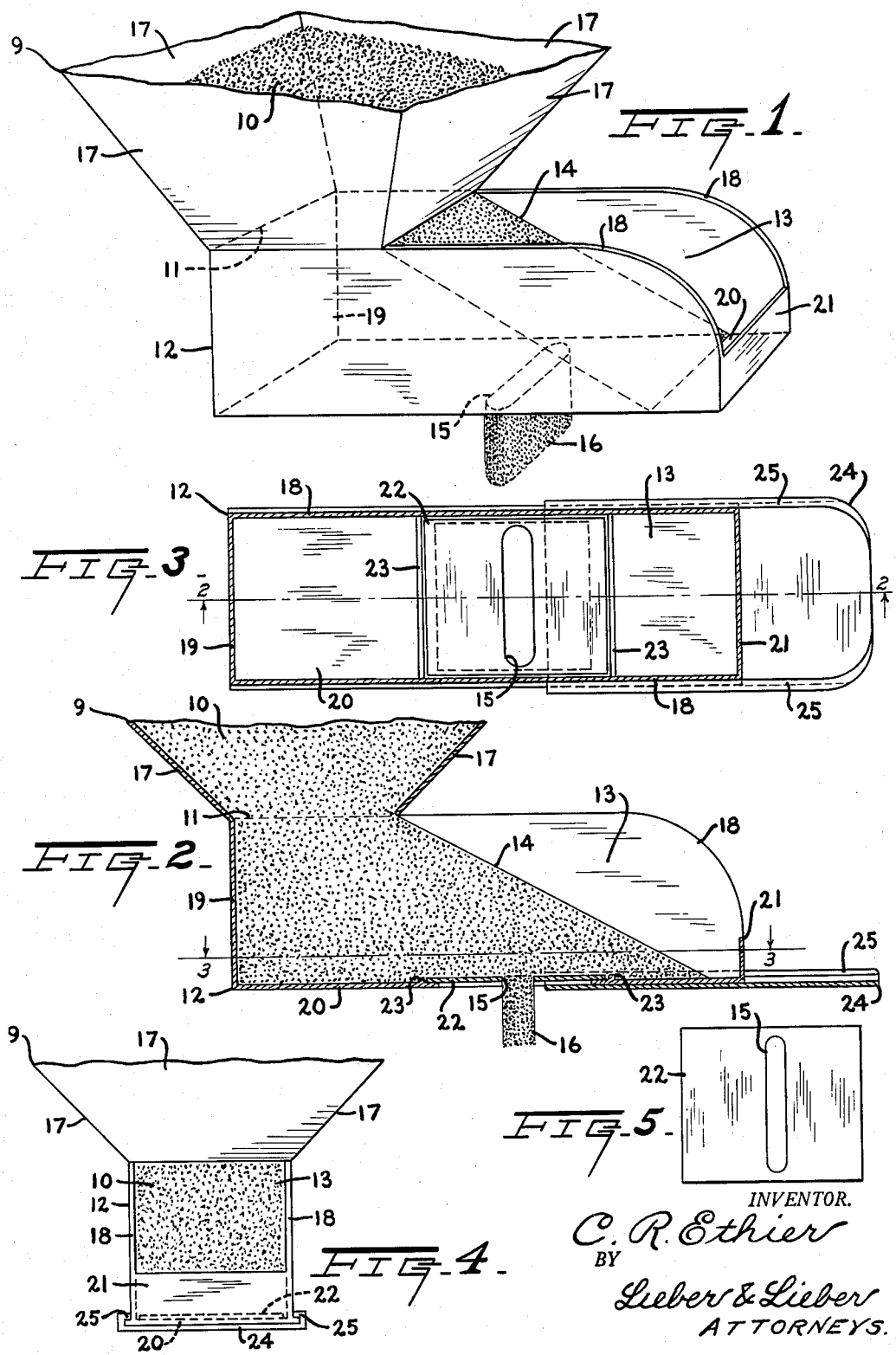

2,742,203
ART OF FEEDING GRANULAR MATERIAL

Clyde R. Ethier, Milwaukee, Wis., assignor to George M. Pendergast & Co., Milwaukee, Wis., a partnership Application June 13, 1951, Serial No. 231,390

3 Claims. (Cl. 222—575)

The present invention relates generally to improvements in the art of feeding granular or like material, and relates more particularly to an improved method of and apparatus for feeding dry materials of a granular or pulverulent nature at a constant speed.

A primary object of the invention is to provide an improved constant feed regulator for diverse materials which is extremely simple, compact and economical in construction and which is adapted to effectively perform the several steps of the improved method.

It is common practice in industries such as the sand and gravel industry to store large quantities of the granular or like material in storage bins for piecemeal or batch distribution in accordance with demands. These storage bins are usually in the form of large hoppers having feed gates in the bottom thereof through which the material is fed directly to the trucks or other hauling vehicles in approximately the desired quantities. Since the rate of feed of the material through a discharge opening of a given size is directly dependent upon the height of the pressure head above the opening, the rate at which the material is loaded upon the hauling vehicle varies considerably in accordance with the amount in the storage bin or hopper at the time of the loading; and it is, therefore ordinarily impossible to measure the quantity of material fed from the hopper during a given time interval even with a fair degree of accuracy. Because of this fact, it is usually necessary to station more-or-less expert personnel at each of the hoppers during loading to carefully watch the loading process so as to approximate the quantity of material fed from the supply hopper to the hauling vehicle.

It is therefore a more specific object of this invention to provide improvements in the art of feeding materials such as sand or gravel which enables relatively accurate measurement of the material and obviates the disadvantages attendant prior methods of loading and measuring such materials.

Another specific object of the invention is to provide an improved method of feeding granular material by gravity from a source of supply at a uniform rate of delivery for a given discharge opening and an improved apparatus for exploiting the method.

Another specific object of my invention is to provide an improved method of and apparatus for delivering a constant stream of granular or pulverulent material by gravity under a constant pressure head so as to provide a uniform flow of the material, thereby enabling reasonably accurate measurement of the quantity of the material delivered in certain time intervals.

Still another specific object of my present invention is to provide an improved constant feed regulator for delivery of granular or like materials which is adapted to be readily applied to and utilized with a storage hopper or bin of ordinary construction and in which the natural angle of repose of the material is utilized to provide a constant pressure head above the discharge orifice regardless of the amount of material in the main bin or hopper.

A further specific object of the present invention is to provide an improved constant feed device for dry granular materials which comprises exceedingly few parts, all of which are readily accessible, which may be readily operated by a novice to effectively deliver desired quantities of the material, and which provides for quick and easy variation in the size of the discharge opening to thereby accommodate different materials and to also vary the delivery rate of such materials.

An additional specific object of the present invention is to provide an improved method of feeding granular material, which comprises, causing the bulk material to establish and to constantly maintain an inclined upper bounding surface coincident with the natural angle of repose of the material, and delivering a stream of the material from the mass beneath the inclined surface under constant pressure head.

A still further specific object of the present invention is to provide a feed regulator for granular material comprising, means for constantly depositing fresh granular material in bulk into a definite zone to constantly maintain an upper inclined bounding surface for the mass which is coincident with the natural angle of repose of the material, and means forming a delivery orifice for discharging a constant stream of the material from the bottom of the mass beneath said inclined surface.

These and other objects and advantages of the invention will be apparent from the following detailed description.

A clear conception of the several steps involved in the improved method of feeding granular material, and of a typical constant feed regulator for effecting commercial exploitation of the novel method, may be had by referring to the drawing accompanying and forming a part of this specification wherein like reference characters designate the same or similar parts in the several views.

Fig. 1 is a somewhat diagrammatic perspective view, of a typical granular material feed regulator embodying the invention, showing the unit in action;

Fig. 2 is a vertical section through a somewhat more refined feed regulator embodying a replaceable discharge orifice plate and a shut-off gate, the section having been taken along the line 2—2 of Fig. 3;

Fig. 3 is a horizontal section through the regulating device of Fig. 2, taken along the line 3—3 thereof;

Fig. 4 is an end view of the feed regulating assemblage of Figs. 2 and 3, looking into the open end of the flow conversion zone; and Fig. 5 is a top view of a replaceable feed plate having a somewhat narrower discharge orifice than that shown in Fig. 3.

While the improvement has been particularly described herein as being especially advantageously applicable in the delivery of granular material such as sand or gravel from immediately below a supply hopper of particular construction, it is not desired or intended to unnecessarily restrict or limit the scope or utility of the invention by virtue of such restricted application; and it is also contemplated that certain descriptive terms used herein be given the broadest possible interpretation consistent with the disclosure.

In accordance with my present improved method of feeding granular material, I constantly deposit a fresh supply of bulk material by gravity within a definite zone to continuously establish upon the mass an upper inclined bounding surface coincident with the natural angle of repose of the material, and then deliver a constant stream of the material by gravity from the bottom of the mass beneath the inclined surface within the zone under constant pressure head.

In the commercial exploitation of my improved granular material feeding method, I prefer to utilize a unitary installation substantially like that shown diagrammatically in the accompanying drawing. Referring to the drawing, the feed regulator shown therein comprises, in general, a main supply hopper or bin 9 for storing large quantities of granular or pulverulent material 10, the supply bin 9 being formed with a lower outlet or discharge opening 11 through which fresh bulk material from the bin 9 is permitted to constantly gravitate; a lower casing 12 forming a bulk material receiving chamber or zone 13 extending below and laterally of the opening 11, the casing 12 being open at its end remote from the bin and also being of sufficient length to permit the bulk granular material 10 descending through the opening 11 to form an upper inclined bounding surface 14 coincident with the natural angle of repose of the material 10; and means forming a lower delivery orifice 15 for finally discharging a constant stream 16 of the material 10 from the bottom of the mass within the zone 13, the delivery orifice 15 being disposed laterally of or out of vertical alinement with the opening 11 and beneath the inclined surface 14.

The main material supply bin or hopper 9 may be of any ordinary construction having the lower portions of the side walls 17 thereof inclined inwardly toward the discharge opening 11, and this bin is of large capacity so as to preclude the necessity of constant reloading. The lower casing 12 comprises side walls 18, an end wall 19 and a bottom wall 20 and may be left open at the top, as shown; and this casing 12 is either formed integral with or is secured at one end thereof directly to the supply bin 9 adjacent to the opening 11 in any suitable manner, a splash guard or wall 21 being preferably provided at the open end of the casing remote from the fresh material supply opening 11. The final material delivery or feed orifice 15 may be formed either directly in the bottom wall 20 of the casing 12 or in a removable and replaceable orifice plate 22, as shown, the plate 22 being positionable between stops 23 on the bottom wall 20 for ready removal and replacement when it is desired to substitute a plate with a different size orifice 15. While the supply opening 11 is constantly open to continuously discharge a fresh supply of the material 10 from the hopper 9 into the adjacent end of the casing 12 so as to constantly maintain the upper inclined bounding surface 14 coincident with the natural angle of repose of the material, suitable means such as a slide gate 24 having inturned side flanges 25 cooperable with the bottom wall 20 is provided for periodically opening and closing the final delivery orifice 15 as required.

In operation, a large supply of the granular material 10 is placed within the bin or hopper 19; and regardless of the amount of such material in the bin, it gravitates downward through the discharge opening 11 until the space in the chamber 12 immediately below the opening 11 is filled. By reason of the fact that the material 10 is of a granular nature and the zone 13 extends laterally of the opening 11 with no obstructions whatsoever in such zone, sufficient additional material gravitates through the opening 11 to permit the material within the chamber 12 to seek its natural angle of repose, thereby forming an inclined upper bounding surface extending laterally of the opening 11 within the zone 13. When it is desired to periodically withdraw batches or given amounts of material from the storage supply, the slide gate 24 is opened in an obvious manner and material is permitted to gravitate through the feed or discharge orifice 15 below the inclined surface 14; and since the zone 13 is constantly open to the supply bin 9, sufficient additional material continues to gravitate through the opening 11 to constantly replace the material withdrawn through the orifice 15 and continually maintain the inclined surface 14 coincident with the natural angle of repose of the material. Accordingly since the surface 14 is maintained at a constant angle, the pressure head immediately above the final delivery orifice 15 is also constant at all times; and the rate of flow of the stream 16 of the material from the feeding device continues at a constant rate as long as the gate 24 is open and there is any material within the bin 9, thereby permitting accurate measurement of the material finally delivered through the orifice 15 during certain time intervals without regard to the amount of material 10 in the bin 9.

From the foregoing detailed description, it will be apparent that my present invention contemplates provision of an improved production method of feeding granular material under constant pressure head, and an improved apparatus for commercially exploiting the method in a most efficient manner. Through utilization of the improved method, dry granular or pulverulent material may be periodically withdrawn from a supply bin in measured amounts and with a high degree of accuracy merely by timing the period of feed or final delivery thereof which eliminates the element of guess and need for an expert; and the improved apparatus for effecting the method is extremely simple and inexpensive as well as durable and compact in construction. The improved feed regulator may be readily installed and utilized with existing supply installations or may be incorporated directly in new units, and all parts of the devices are readily accessible with no working parts to get out of repair. Obviously, any material of a granular or pulverulent nature may be accurately fed and measured with the aid of the improvement, and the improved device has, in fact, proven highly successful in actual commercial exploitation of the method in dispersement of industrial sands wherein it is essential to obtain accurate measurements. As indicated, the delivery orifice 15 may be formed in a removable and replaceable plate 22 so as to permit ready adjustments in the size of the orifice used with the unit; and the top and remote end of the casing 12 may be left open and a splash preventing wall 21 provided, if desired, or the laterally extending portion of the casing may be enclosed.

It should be understood that it is not desired or intended to limit this invention to the exact steps of the method, or to the precise details of construction of the feed regulator, herein shown and described, since various modifications within the scope of the appended claims may occur to persons skilled in the art to which the invention pertains.

I claim:

1. In a feed regulator for granular material, an upwardly open non-rotatable granular material supply bin having a lower discharge opening, an integral upwardly open casing disposed beneath said bin and forming a bulk material receiving zone constantly communicating directly with said opening and extending laterally thereof in one direction only to permit material gravitating through said opening to form and constantly maintain an inclined upper bounding surface coincident with the natural angle of repose of the material extending downwardly in said one direction away from the bounding edge of the bin opening entirely within said casing, said casing having a bottom opening disposed laterally of said bin discharge opening beneath an intermediate portion of said inclined surface, and a removable plate covering said casing bottom opening and having a transversely extending delivery orifice therein for discharging a constant stream of the material from the bottom of the mass beneath said intermediate portion of said inclined surface under constant pressure head.

2. In a feed regulator for granular material, an upwardly open granular material supply bin having a lower discharge opening, and an integral upwardly open casing disposed beneath said bin and forming a bulk material receiving zone constantly communicating directly with said opening and extending laterally thereof in one direction to permit material gravitating through said opening to form and constantly maintain an inclined upper bounding surface coincident with the natural angle of repose of the material extending downwardly in said one direction away from the bounding edge of the bin opening entirely within said casing, said casing having a downwardly open and unobstructed delivery orifice in its bottom wall disposed laterally of said bin discharge opening beneath and intermediate portion of said inclined surface for freely discharging a constant stream of the material from the bottom of the mass beneath said intermediate portion of said inclined surface under constant pressure head.

3. In a feed regulator for granular material, an upwardly open granular material supply bin having a lower discharge opening, and an integral upwardly open casing disposed beneath said bin and forming a bulk material receiving zone constantly communicating directly with said opening and extending laterally thereof in one direction to permit material gravitating through said opening to form and constantly maintain an inclined upper bounding surface coincident with the natural angle of repose of the material extending downwardly in said one direction away from the bounding edge of the bin opening entirely within said casing, said casing having a bottom wall lying in a single substantially horizontal plane and provided with a delivery orifice disposed laterally of said bin discharge opening beneath an intermediate portion of said inclined surface for discharging a constant stream of the material from the bottom of the mass beneath said intermediate portion of said inclined surface under constant pressure head.

References Cited in the file of this patent

UNITED STATES PATENTS

| | | |
|---|---|---|
| 442,766 | Brennan, Jr. | Dec. 16, 1890 |
| 450,267 | Walker | Apr. 14, 1891 |
| 702,731 | Hoover et al. | June 17, 1902 |
| 1,685,512 | Varusky | Sept. 25, 1928 |
| 1,755,490 | Seymour | Apr. 22, 1930 |
| 1,866,781 | Ullrich | July 12, 1932 |
| 1,896,724 | Stein | Feb. 7, 1933 |
| 2,269,761 | Gavreau | Jan. 13, 1942 |
| 2,441,724 | Simpson | May 18, 1948 |
| 2,593,535 | Cannon, Jr. | Apr. 22, 1952 |